United States Patent [19]

Rehfeld

[11] Patent Number: 4,832,071

[45] Date of Patent: May 23, 1989

[54] FLUID MOTOR METERING DEVICE

[75] Inventor: Frederick L. J. Rehfeld, Saginaw, Mich.

[73] Assignee: Leber Corporation, Midland, Mich.

[21] Appl. No.: 138,388

[22] Filed: Dec. 28, 1987

[51] Int. Cl.⁴ ............................................ G05D 11/03
[52] U.S. Cl. ..................................... 137/99; 417/377; 417/403
[58] Field of Search ................... 137/99; 417/377, 403

[56] References Cited

U.S. PATENT DOCUMENTS 3,937,241 2/1976 Cloup .................................... 137/99
4,394,870 7/1983 MacPhee .............................. 137/99

Primary Examiner—Robert G. Nilson
Attorney, Agent, or Firm—Robert J. Rhead

[57] ABSTRACT

This invention relates to a pumping device that is adaptable for commercial and residential use that incorporates a series of pistons and valves that automatically and proportionally injects such fluids as fertilizers, oils, soaps and food syrups into various other liquid mediums.

3 Claims, 3 Drawing Sheets

Controlled fluid in

Mixture of controlled fluid & metered fluid out

Metered fluid in

FLUID MOTOR METERING DEVICE

BACKGROUND OF THE INVENTION

This invention refers to a pumping device. More practically it refers to an inexpensive, self powered, portable, compact, self priming, positive displacement, mounted and/or unmounted device available to the lawn and garden users to use on existing lawn/garden water hose nozzles or sprayers to apply fertilizers, herbicides and/or pesticides by the use of the garden hose regardless of the hose flow or back pressures. It has been known in the prior art to use Venturi devices to accomplish similar ends but they are limited by back pressure exhibited at the orifice of the Venturi. Back pressure in the Venturi system is caused, among other things, by the length of hose, its size, and the type of nozzle or sprinkler.

I have found that by using the input flow of water into this device that it will pump another substance or substances at the rate proportional to the input fluid flow.

PRIOR ART

Most pertinent classes/subclasses were 47/85.5, 239/310 and 239/74. The following patent references are believed to be of general interest in view of my invention.

U.S. Pat. No. 4,557,071 to Fah (1985) disclosing a watering and feeding system for plants, comprising a container enclosing a platformed water reservoir, housing a water supply unit, a fertilizer dispensing unit, a nutrient conveying wick and a water level indicator unit, all of which are interacting to provide automatic and adequately measured amount of nutients to the plants.

U.S. Pat. No. 4,340,179 to Knapp (1982) a lawn and garden feeding apparatus including a container made of transparent plastic, having inlet and outlet hose connections and a disposable cartridge which is inserted into the container. The cartridge comprises a gel with plant nutriment and a water soluble dye suspended therein with the cartridge fitting the inside of the container and having a bore communicating with the inlet and outlet connections. The container inlet is connected by a garden hose to a source of water and the outlet is connected by a hose to a conventional sprinkler or nozzle so that in use of apparatus, water flows through the cartridge bore drawing nutriment and dye from the gel in micro-feeding amounts, and is discharged through the sprinkler or nozzle. Extraction of dye from the gel, after a selected period of time, results in a perceptible change in gel color, indicating that the cartridge requires replacement.

U.S. Pat. No. 4,315,600 (1982) to Rhoades which deals with a trigger actuated fertilizers spray gun which has a herbicide injector mounted on its muzzle with the valve for the injector having an actuator which is also accessible from the handle of the gun, so that an operator, while spraying fertilizer, can make spot applications of a herbicide as weeds are encountered in the area being fertilized. The herbicide is carried in a cansister which can either be mounted on the handle of the spray gun or on a belt worn by the operator and the canister is divided into first and second, variable volume chambers by a flexible diaphragm. The first chamber is connected to the flow passage of the fertilizer to pressurize it to approximately the line pressure of the fertilizer flow, and the second chamber, containing the herbicide, is connected to the injector at a venturi-shaped portion of a passage through it. The second, herbicide filled chamber is therefore under pressure exerted by the diaphragm so that when the valve is opened the herbicide is sprayed into the flow of fertilizer passing through the injector. The venturi-shaped portion of the passage at the point where the herbicide is injected into the fertilizer flow also facilitates herbicide flow so that there is an almost instantaneous flow of herbicide into the fertilizer when the valve is actuated.

U.S. Pat. No. 2,060,735 (1936) to Krueger which deals with a method and a means for applying nutrient solutions to plants by forced aeration of the plant bed by feeding a nutrient solution from the under part of the plant bed and then automatically draining off the solution and the means of accomplishing the same.

SUMMARY OF THE INVENTION

The device of this invention is activated by a controlled input fluid flow. This device pumps another substance or substances, i.e. metered fluid, at a rate proportional to the controlled input fluid flow. This device has an accessible cylindrical housing unit, having a controlled input fluid inlet opening connected to an inlet chamber, having a discharge opening connected to a discharge chamber.

A metered fluid chamber or chambers connected to an inlet opening for the fluid or fluids to be metered or pumped. A means is provided of moving or pumping the fluids to a discharge chamber or chambers.

The discharge chamber or chambers of the fluids being metered or pumped may be or may not be common with each other and or the controlled fluid discharge chamber as desired.

The various chambers in the accessible cylindrical housing are separated from each other. This separation is accomplished by interconnecting passage ways. The passage ways are opened or closed by valves by a means so that pressure is applied to the pistons and the pistons are so moved by this pressure so as to assure the desired ratio of metered fluids are pumped relative to the control input fluid flow. The mixing chamber and discharge chamber are the same cylinder separated by valves and a piston.

The controlled fluid is introduced into the control fluid inlet chamber. The flow rate of this controlled fluid may be varied by either limiting the flow rate into the inlet chamber or by limiting how fast it can flow out the discharge outlet.

This invention has a special utility for dispersing controlled fluids in a wide area of applications; for example, in the dispensing of liquid soaps into wash media; in the dispensing of concentrated soda pop syrups into carbonated waters; in the mixing of oils into gasoline in two-cycle engines; and any other mechanical mixing of fluids. These are examples and this invention is not limited by these examples.

DESCRIPTION OF THE INVENTION

Figure 1:
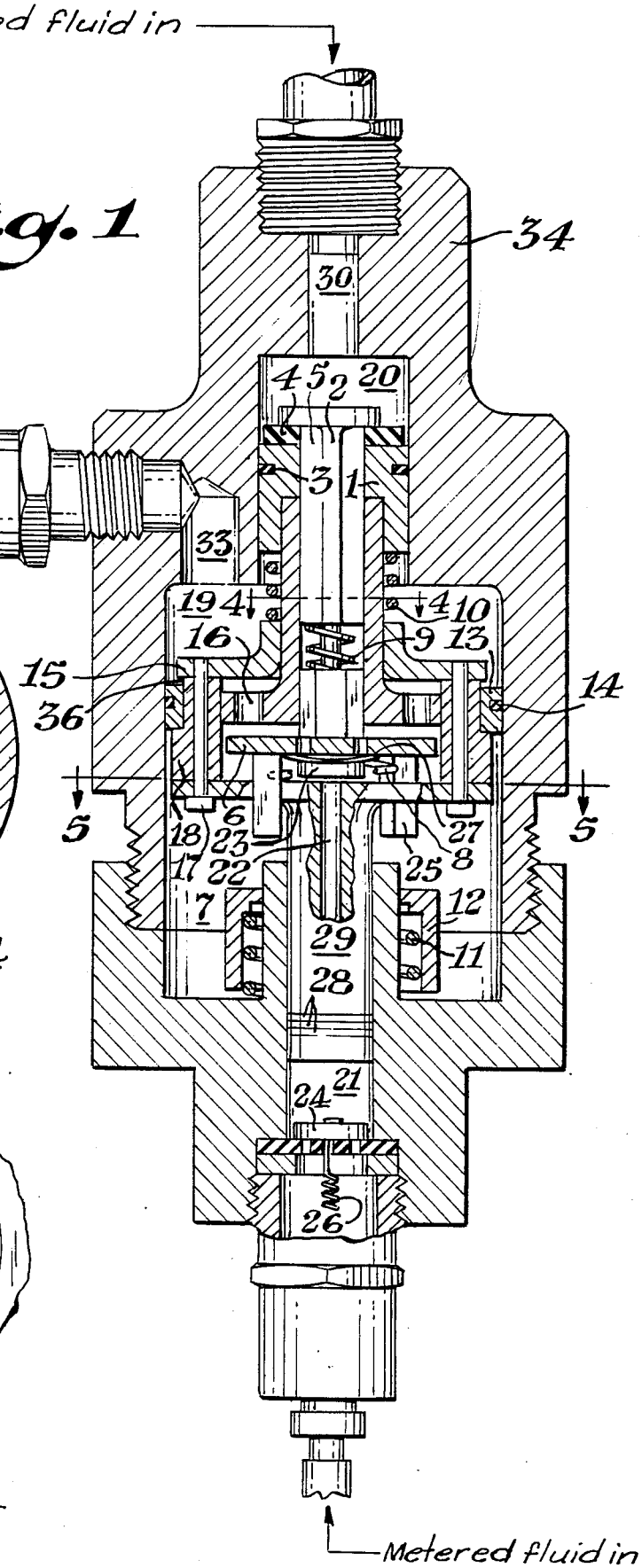
FIG. 1 is a diagrammatic plan of the device in its entirety, according to the invention, injecting in the metered fluid.
Figure 5:
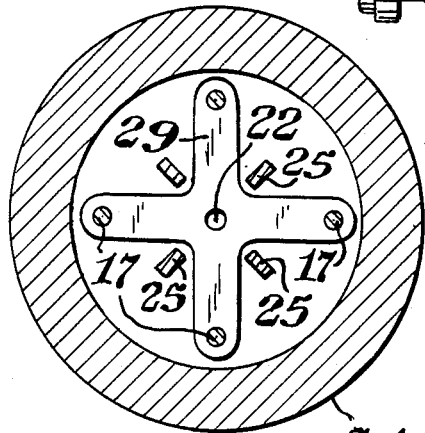
FIG. 5 is a cross section of line 5—5 of FIG. 1.
Figure 4:
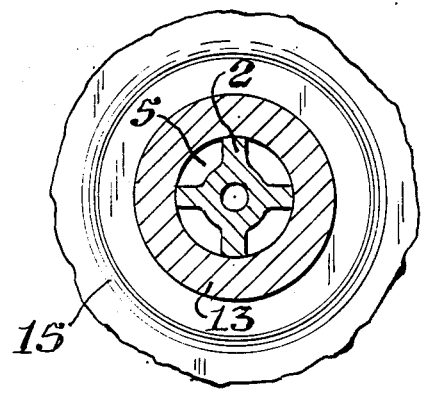
FIG. 4 is a cross section of line 4—4 of FIG. 1.

In the drawings like reference characteristics designate similar parts in the several views of the drawings. The inlet chamber 20 contains spring loaded lift valve 2, first piston of lesser working area 1 and seals 3 and 4.

Figure 2:
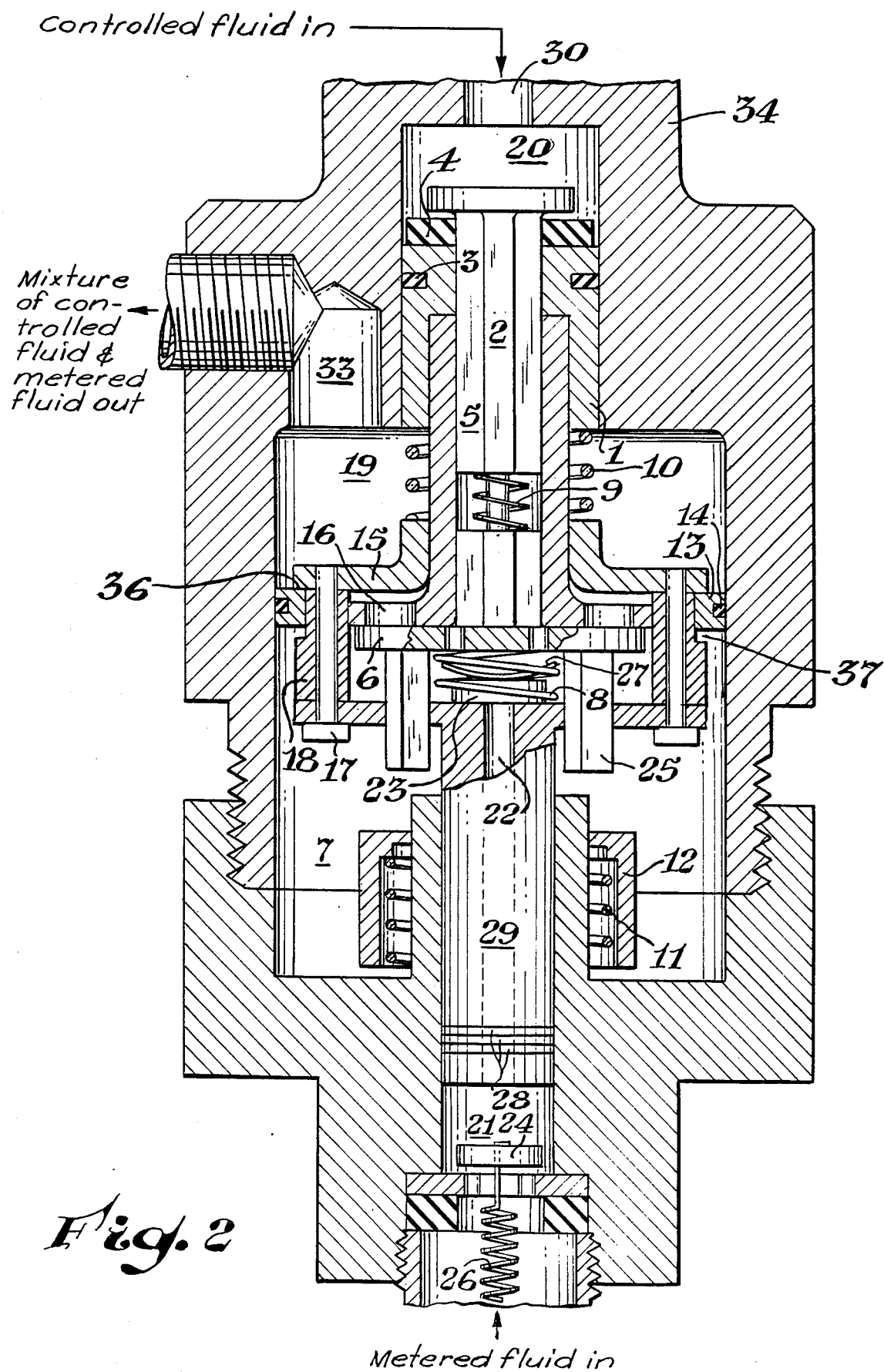
FIG. 2 is a diagrammatic plan of the device in its entirety, metering in the metered fluids.
Figure 3:
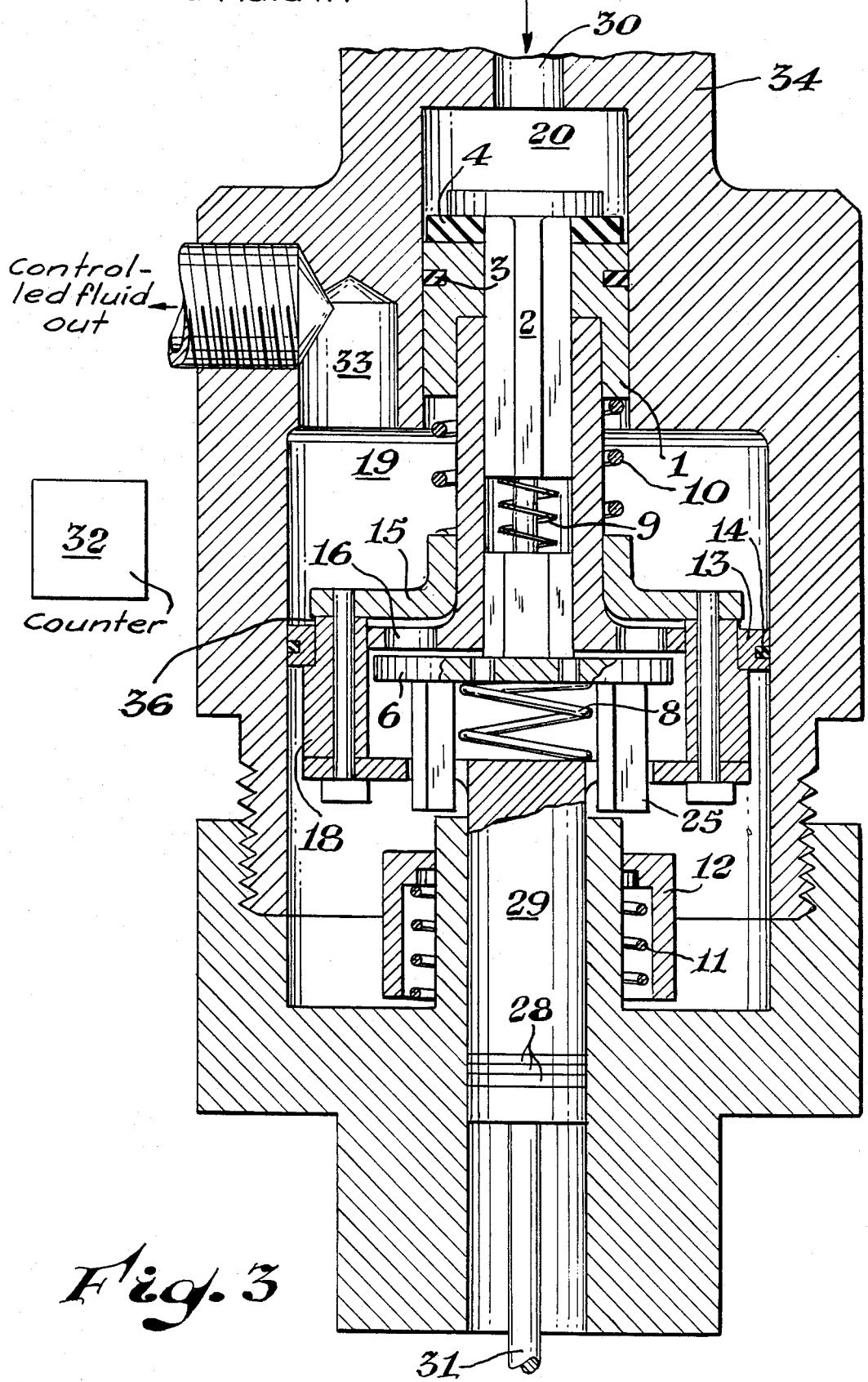
FIG. 3 is a diagrammatic plan of the device with the counting device and a mechanical linkage.

Spring loaded lift valve 2 and seal 4 can close symmetrical passage 5 to the mixing chamber 7. Spring loaded lift valve 2 & spring loaded reversing valve 6 both fit in symmetrical passage 5 and their length is such as to prevent both spring loaded lift valve 2 & spring loaded reversing valve 6 from being closed at the same time. There is also a weak spring 9, between the spring loaded lift valve 2 & spring loaded reversing valve 6 that tend to keep them apart. FIG. 2 shows spring loaded reversing valve 6 closed.

There is also a weak spring 8, strong enough to overcome gravity in any direction of operation and hold spring loaded reversing valve 6 closed unless some other force is holding spring loaded reversing valve 6 open.

As shown in FIG. 2, spring loaded lift valve 2 is opening and spring loaded reversing valve 6 is closed. Therefore, when controlled fluid flows into controlled fluid inlet chamber 20, it flows past spring loaded lift valve 2, past seal 4, thru symmetrical passage 5 into mixing chamber 7. Valve 23, spring loaded reversing valve 6, seal 14 and seal 28 block the controlled fluid flow from metered fluid chamber 21 and discharge chamber 19. Because second piston of greater working area 13 is larger than the first piston, the controlled fluid flow moves the first piston and the second piston toward the controlled fluid inlet opening 30 of accessible cylindrical housing 34.

The movement of the second piston area 13 toward the discharge chamber 19 forces fluid out the discharge opening 33. As this movement continues the spring loaded lift valve 2 approaches the end of controlled fluid inlet chamber 20. Fluid flow prevents spring loaded lift valve 2 from physically touching housing 34, this movement then compresses the spring 9. Further movement causes spring loaded lift valve 2 to touch spring loaded reversing valve 6. This touching and/or the force of spring 9 opens spring loaded reversing valve 6. This opens one or more orifices 16 but does not, repeat, does not stop the movement of the second piston. Controlled fluid flow will continue to move the first piston and the second piston in the same direction they were going.

Injection metering piston 29 shown here as a single piston but in fact could be several pistons if it is desired to pump more than one substance or substances at more than one rate, or to more than one place.

Force is required to over come seal friction of this piston or pistons similar to injection metering piston 29. Also, force is required to pump against the pressure in mixing chamber 7. These combined forces are transmitted to spring loaded flow control valve 15 by connectors 17. Spring loaded flow control valve 15 has an area such that the variable force transmitted to it by connectors 17 and the force of spring 10 are sufficient ot cause adequate pressure drop of any controlled fluid that passes through one or more plurality of orifices 16 from mixing chamber 7 to discharge chamber 19 so as to effectively block the flow. This causes the first piston and the second piston to continue moving until the spring loaded lift valve 2 closes on seal 4.

The area of spring loaded flow control valve 15 and the spring force load of spring 10 and the load of connector 7 acting on spring loaded flow control valve 15 must be such that when spring loaded lift valve 2 closes the rise of pressure in the controlled fluid inlet chamber 20 is able to do two things. First, keep spring loaded lift valve 2 closed against seal 4 by raising the pressure in controlled fluid inlet chamber 20 above the pressure in mixing chamber 7 and secondly, this rise in pressure in controlled fluid inlet chamber 20 acting on the first piston must be able to raise the pressure in mixing chamber 7 higher than discharge chamber 19 so that spring loaded flow control valve 15 is raised off its face seal 36 and the first piston of lesser working area 1 and the second piston are reversed and fluid in mixing chamber 7 is forced to discharge chamber 19 and out the discharge port 33.

Note, force on injection metering piston 29 and or any other pistons doing similar work are transferred to spring loaded flow control valve 15 and depending on the pressure in mixing chamber 7 and seal friction at seal 28 plus the pressure in metered fluid chamber 21 and or similar chambers will vary the load on the connector 17. This force on connector 17 plus the force of spring 10 can cause the pressure drop from mixing chamber 7 to discharge chamber 19, which is required to raise spring loaded flow control valve 15 opening face seal 36, to be self adjusting as required for various operating conditions. It is important that spring loaded flow control valve 15 and its face seal 36 restrict the flow through the one or more orifices 16 adequately so that the first piston has enough pressure on it so spring loaded lift valve 2 stays seated until the other end of the stroke.

Metered fluid chamber 21 is filled with metered fluid that comes in through valve 24 which is closed by spring 26 when injection metering piston 29 has caused the volume of metered fluid chamber 21 to be maximum.

When the first piston and the second piston 13 reverse than as soon as the lost motion 37 between the assembly of injection metering piston 29, connector 17, spacer 18 and spring loaded flow control valve 15 relative to the second piston 13 is taken up injection metering piston 29 reverses. The reversal then causes the substance in metered fluid chamber 21 to be discharged through passage 22 to valve 23 which is raised against spring 27. The metered fluid mixes with the controlled fluid in mixing chamber 7 and passes through the now open spring loaded reversing valve 6 and one or more orifices 16 and via face seal 36 of spring loaded flow control valve 15 and the second piston 13 into discharge chamber 19.

It is realized that for some applications it may be not be desirable to have the output of chamber 21 be mixed with the controlled fluid in chamber 7.

In this case the output of metered chamber 21 and valve 23 could be re-routed to a different point of discharge. It is also realized what is shown as a single injection metering piston 29 could be several pistons pumping the same or other substances at various ratios to various places as desired.

The piston assemblies of the first piston 1, second piston 13, and injection metering piston 29 continues movement toward metered fluid chamber 21 until first the legs of the spring loaded reversing valve 6, one leg shown by 25, strikes stop 12 and receives the force of spring 11.

As movement of the piston assemblies continue, the force of spring 11 and or the bottoming of stop 12 forces the spring loaded reversing valve 6 against spring loaded lift valve 2. Stop 12 and spring loaded reversing valve 6 stop spring loaded lift valve 2 from moving toward metered fluid chamber 21. Controlled fluid flow keeps pushing against the first piston 1 until spring loaded lift valve 2 is unseated from seal 4. This allows the pressure in controlled inlet chamber 20 to approach the pressure of mixing chamber 7. This lowers the force trying to hold spring loaded lift valve 2 on seal 4 and spring 11 quickly closes spring loaded reversing valve 6 which opens spring loaded lift valve 2 still further. Spring 9 now moves spring loaded lift valve 2 far off its seat so that to prevent pressure surges in the controlled fluid input lines from prematurely closing spring loaded lift valve 2.

As soon as spring loaded reversing valve 6 closes controlled fluid flow reverses the direction of the first piston 1 and the second piston 13. At the time of reversal friction of seal 28 of injection metering piston 29 and or other similar pistons pumping a metered fluid could have been enough so connector 17 could have been holding spring loaded flow control valve 15 open and allow flow through one or more orifices 16 if it were not for spring loaded reversing valve 6, restricting this flow. After spring loaded reversing valve 6 closes the plurality of orifices 16 and the first piston 1 and the second piston 13 are reversed and have taken up the lost motion 37 between the assembly of injection metering piston 29, connectors 17, spacer 18, spring loaded flow control valve 15 and the second piston 13, then spring loaded flow control valve 15 is closed and spring loaded reversing valve 6 is no longer required. This is why spring loaded reversing valve 6 may be opened before spring loaded lift valve 2 is closed and not stop the movement of the first piston 1, the second piston 13 and injection metering piston 29 until this movement eventually seats spring loaded lift valve 2 against seal 4 and reverses the piston assemblies again.

It is realized we could either with or without metering piston 29 regardless of porting schemes or similar mechanical connection 31 use a counter and or a pickup unit 32 of some type, count the strokes of the piston assembly of piston 1 and piston 13 so as to measure total controlled fluid flow.

It is also realized that if flow rate and back pressure of the controlled fluid were controlled to reasonably constant value it would be possible to simplify some of the mechanism shown but what we show can operate over a very broad range of flows and back pressures on the controlled fluid.

The theoretical ratio "R" of controlled fluid passed through the system of one (1) unit of metered fluid passed through the system is the diameter "d" squared (diameter of the second piston of greater working area) minus the diameter "d" squared (diameter of the injection metering piston) divided by the diameter "d" squared (diameter of the injection metering piston )

$$R = (D^2 - d^2) \div d^2$$

It should also be recognized that the injection metering piston 29 can be utilized as a piston and be connected to a mechanial arm 31 to do work. The piston rings are preferably made of acetal resin thermoplastic polymer.

While the foregoing has illustrated and described what is contemplated to be the best mode of carrying out the invention, the description is, of course, subject to modifications without departing from the spirit and scope of the invention. Therefore, it is not desired to restrict the invention to the particular construction illustrated and described, but to cover all modifications that may fall within the scope of the appended claims.

I claim:

1. A fluid motor-metering device for the use with a source of controlled fluid, with a controlled fluid discharge means and a metered-fluid source which comprises:

an accessible, cylindrical housing unit having a control fluid inlet opening connected to a control fluid inlet chamber, having therein and aligned to and symmetrical with the control fluid inlet chamber, a discharge chamber, additionally having and aligned to, and symmetrical with the control fluid inlet chamber, a mixing chamber and a metered-fluid chamber connected to a metered-fluid source and positioned within said housing unit an assembly of valves and pistons capable of reciprocal movement within said housing unit which further comprises; interposed and positioned within said assembly of valves and pistons, a first piston of lesser working area positioned within the control fluid inlet chamber, biased on one end by the pressure in the controlled inlet chamber, and biased by the pressure within the discharged chamber on the other end and also having a central, axial passageway positioned therein and capable of transmitting the controlled fluid from the control fluid inlet chamber to the mixing chamber;

interposed and positioned within said assembly of valves and pistons, a second piston of greater working area inter-connected with said first piston and positioned within the discharge chamber, one end biased with the pressure in the discharge chamber, the other end biased with the pressure of the mixing chamber, and further having at least one orifice which permits the transmission of the metered fluid and the controlled fluid from the mixing chamber to the discharge chamber;

within said assembly an injection metering piston having axially positioned therein a passageway capable of transmission of the metered-fluid and inter-connected with the first piston and second piston, and biased with the pressure in the mixing chamber on one end and biased with the pressure in the metering chamber on the other end;

a spring loaded lift valve positioned within the axial passageway of said first piston, said valve is biased with the pressure in the control-fluid inlet chamber in one end, and biased with pressure in the mixing chamber in the other end;

a spring loaded reversing valve axially positioned within said second piston and axially engaging said spring loaded lift valve in the axially passageway in the first piston and capable of controlling the passage of the metered-fluid and its controlled fluid through at least one orifice of the second piston;

and a spring loaded, flow control valve, axially positioned to and adjacent to said second piston, biased with the pressure by said orifices in said second piston on one end, and biased with the pressure of the discharge chamber on the other end, and said valve being capable of controlling the metered-fluid and the controlled fluid through at least one of the orifices in said second piston.

2. A fluid motor-metering device for the use with a source of controlled fluid, with a controlled fluid discharge means and a metered-fluid source as claimed in claim 1 wherein the movement of the first piston of lesser working area is measured by a counting device.

3. A fluid motor-metering device for the use with a source of controlled fluid, with a controlled fluid discharge means and a metered-fluid source as claimed in claim 1 wherein all pistons have piston rings made of acetal resin thermoplastic polymer.

* * * * *